United States Patent
Mun et al.

(10) Patent No.: US 9,784,482 B2
(45) Date of Patent: Oct. 10, 2017

(54) MAGNETIC COOLING APPARATUS AND METHOD OF CONTROLLING THE SAME

(71) Applicant: SAMSUNG ELECTRONICS CO., LTD., Suwon-si, Gyeonggi-do (KR)

(72) Inventors: Il Ju Mun, Suwon-si (KR); Min Soo Kim, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 347 days.

(21) Appl. No.: 14/287,542

(22) Filed: May 27, 2014

(65) Prior Publication Data
US 2014/0366557 A1 Dec. 18, 2014

(30) Foreign Application Priority Data

Jun. 12, 2013 (KR) ........................ 10-2013-0067032

(51) Int. Cl.
*F25B 21/00* (2006.01)

(52) U.S. Cl.
CPC ...... *F25B 21/00* (2013.01); *F25B 2321/0022* (2013.01); *Y02B 30/66* (2013.01)

(58) Field of Classification Search
CPC ... F25B 2321/0022; F25B 21/00; Y02B 30/66
USPC .......................................................... 62/3.1
See application file for complete search history.

(56) References Cited

U.S. PATENT DOCUMENTS

| | | |
|---|---|---|
| 2005/0120720 A1 | 6/2005 | Fang et al. |
| 2009/0308079 A1* | 12/2009 | Lee .......................... F25B 21/00 62/3.1 |
| 2010/0071383 A1* | 3/2010 | Zhang ..................... F25B 21/00 62/3.1 |
| 2010/0236258 A1 | 9/2010 | Heitzler et al. |
| 2011/0061399 A1* | 3/2011 | Chang ..................... F25B 21/00 62/3.1 |
| 2012/0266607 A1* | 10/2012 | Morimoto .......... B60H 1/00899 62/3.1 |
| 2012/0272665 A1 | 11/2012 | Watanabe et al. |
| 2014/0190182 A1* | 7/2014 | Benedict ................. F25B 21/00 62/3.1 |

FOREIGN PATENT DOCUMENTS

EP 1 847 788 10/2007

OTHER PUBLICATIONS

European Search Report dated May 9, 2014 in corresponding European Application No. 14157166.1.

\* cited by examiner

*Primary Examiner* — Len Tran
*Assistant Examiner* — Ana Vazquez
(74) *Attorney, Agent, or Firm* — Staas & Halsey LLP

(57) ABSTRACT

A magnetic cooling apparatus having a plurality of cooling modules, where each of the cooling modules includes at least one magnetic regenerator allowing a heat transfer fluid to pass therethrough and filled with a magnetocaloric material; and a fluid supply device to supply the heat transfer fluid into the magnetic regenerator. The cooling modules are rotatably arranged in a circumferential direction.

9 Claims, 8 Drawing Sheets

MAGNETIC COOLING APPARATUS AND METHOD OF CONTROLLING THE SAME

CROSS-REFERENCE TO RELATED APPLICATIONS

This application claims the benefit of Korean Patent Application No. 10-2013-0067032, filed on Jun. 12, 2013 in the Korean Intellectual Property Office, the disclosure of which is incorporated herein by reference.

BACKGROUND

1. Field

Embodiments of the present disclosure relate to a magnetic cooling apparatus using properties of a magnetocaloric material and a method of controlling the same.

2. Description of the Related Art

A magnetic cooling apparatus, which uses properties of a magnetocaloric material, which produces heat when magnetized in a magnetic field and absorbs heat when released from the magnetic field and is thus demagnetized, is a new cooling system that may replace conventional cooling apparatuses, which use an air compression cycle.

The magnetic cooling apparatus generally includes a magnetic regenerator filled with a magnetocaloric material, a magnet to apply and remove a magnetic field to the magnetic regenerator, a heat exchange unit allowing a heat transfer fluid passing through the magnetic regenerator to absorb heat from or dissipate heat to the external air, and a flow passage to guide flow of the heat transfer fluid.

Accordingly, heat transferred to the heat transfer fluid that passes through the magnetic regenerator is subjected to the magnetic field, and the heat transfer fluid releases the heat to the external air through the high-temperature heat exchanger. After releasing heat in the high-temperature heat exchanger, the heat transfer fluid loses heat while passing through the magnetic regenerator from which the magnetic field has been removed. Then, the heat transfer fluid absorbs heat from the external air through the low-temperature heat exchanger. After absorbing heat in the low-temperature heat exchanger, the heat transfer fluid flows again into the magnetic regenerator placed in the magnetic field and undergoes the same process.

To enhance cooling performance, a rotary magnetic cooling apparatus may be employed as the magnetic cooling apparatus. In rotation of the magnetic cooling apparatus, at least one magnetic regenerator is used, and a rotary valve is installed in the flow passage to transfer the heat transfer fluid to each magnetic regenerator.

The direction of movement of the heat transfer fluid needs to change according to the time of magnetization/demagnetization of each magnetic regenerator. Accordingly, the rotary valve needs to sequentially change in the direction of movement of the heat transfer fluid. The rotary valve needs to perform the "rotation" function and "sealing" function for the heat transfer fluid. The "rotation" function should allow two different components to rotate with a gap therebetween. The "sealing" function should allow two different components to be completely attached to each other without a gap therebetween.

To satisfy these two functions, mechanical components such as bearings and an oil seal have been developed. These components are operable at a lower pressure. However, when the fluid is quickly reciprocated at a high frequency (1 Hz to 8 Hz), the fluid is pressurized to about 10 bar. Accordingly, the rotary seal may be broken, resulting in leakage of the fluid when the pressure becomes equal to or greater than a certain pressure.

SUMMARY

Therefore, it is an aspect of the present disclosure to provide a magnetic cooling apparatus that may employ plural magnetic cooling units to address disadvantages of the rotary seal and enhance cooling performance and a method of controlling the same.

Additional aspects of the disclosure will be set forth in part in the description which follows and, in part, will be obvious from the description, or may be learned by practice of the disclosure.

In accordance with one aspect of the present disclosure, a magnetic cooling apparatus includes a plurality of cooling modules, each of the cooling modules including at least one magnetic regenerator allowing a heat transfer fluid to pass therethrough and filled with a magnetocaloric material, and a fluid supply device to supply the heat transfer fluid into the magnetic regenerator, wherein the cooling modules are rotatably arranged in a circumferential direction.

The magnetic cooling apparatus may further include a plurality of magnets to apply a magnetic field to the magnetic regenerator and withdraw the applied magnetic field, wherein the cooling modules may be disposed in the magnetic field created by the magnet.

The magnets may be disposed at an inner side and an outer side in a circular form, with the magnetic regenerator placed between the magnets.

The magnets may be four-pole magnets configured with four magnetic field regions and four non-magnetic field regions.

The cooling modules may be disposed between the inner-side magnets and outer-side magnets of the magnets in a circumferential direction.

The magnetic regenerators may be arranged in an array between the inner magnets and the outer magnets to construct a magnetic regenerator unit.

A flow passage to guide flow of the heat transfer fluid supplied to the fluid supply devices may be provided at opposite ends of the magnetic regenerator unit.

A heat exchanger may be disposed on the flow passage provided at opposite ends of the magnetic regenerator unit.

The fluid supply devices provided to the cooling modules may be connected to each other to form one unit such that the heat transfer fluid flows in the same direction.

The magnetic cooling apparatus may further include a first drive unit to drive the fluid supply devices, a second drive unit to rotate the magnetic regenerators, and a controller to control operation of the first drive unit and the second drive unit.

Each of the first drive unit and second drive unit may be a separate motor.

The first drive unit and second drive unit may be a single motor.

In accordance with another aspect of the present disclosure, a method of controlling a magnetic cooling apparatus includes a plurality of cooling modules, each of the cooling modules including at least one magnetic regenerator allowing a heat transfer fluid to pass therethrough and filled with a magnetocaloric material, and a fluid supply device to supply the heat transfer fluid into the magnetic regenerator, includes rotating, by a controller, the magnetic regenerator, and operating, by the controller, the fluid supply device at the time when magnetization and demagnetization of the magnetic regenerator are switched from one to the other according to rotation of the magnetic regenerator.

The magnetic cooling apparatus may further include a plurality of magnets to apply a magnetic field to the magnetic regenerator and withdraw the applied magnetic field, the method further including operating, by the controller, the fluid supply device when magnetization and demagnetization of the magnetic regenerator are switched from one to the other according to rotation of the magnets.

When the magnets rotate, the magnetic regenerator is fixed so as not to rotate.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings, wherein like reference numerals refer to like elements throughout.

Figure 1:
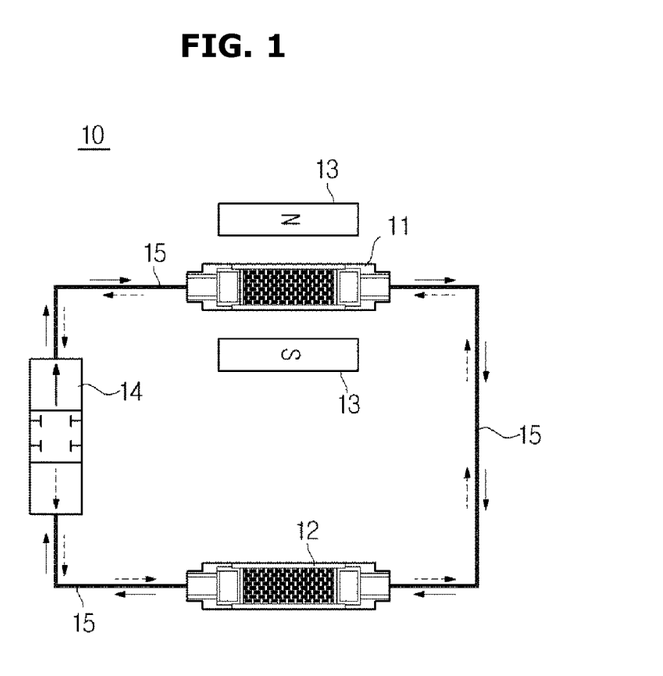
FIG. 1 is a block diagram schematically illustrating a rotary magnetic cooling apparatus according to an exemplary embodiment of the present disclosure.

FIG. 1 is a block diagram schematically illustrating a rotary magnetic cooling apparatus according to an exemplary embodiment of the present disclosure.

In FIG. 1, the rotary magnetic cooling apparatus according to this embodiment uses at least one magnetic regenerator and includes plural cooling modules.

As a basic module constituting the magnetic cooling apparatus, the cooling module 10 includes a pair of magnetic regenerators 11 and 12, a bidirectional fluid supply device 14 (hereinafter referred to as a "fluid supply device") to supply a heat transfer fluid into the magnetic regenerators 11 and 12, and a guide flow passage 15 to connect the magnetic regenerators 11 and 12 to the fluid supply device 14.

The pair of magnetic regenerators 11 and 12 includes a first magnetic regenerator 11 and a second magnetic regenerator 12.

As the first magnetic regenerator 11 and the second magnetic regenerator 12, active magnetic regenerators (AMRs) filled with a magnetocaloric material allowing flow of the heat transfer fluid therethrough are employed.

Magnets 13 to apply a magnetic field to the first magnetic regenerator 11 and the second magnetic regenerator 12 are installed at both sides of the first magnetic regenerator 11 and the second magnetic regenerator 12.

The N poles and S poles of the magnets 13 are provided in at least one pair and movably arranged to apply a magnetic field to the first magnetic regenerator 11 and the second magnetic regenerator 12.

The first magnetic regenerator 11 and the second magnetic regenerator 12 are driven to alternately enter and leave the magnetic field formed between the N poles and S poles of the magnets 13. The first magnetic regenerator 11 and the second magnetic regenerator 12 are magnetized when they enter the magnetic field. The first magnetic regenerator 11 and the second magnetic regenerator 12 are demagnetized when they leave the magnetic field. When the first magnetic regenerator 11 enters the magnetic field to be magnetized, the second magnetic regenerator 12 leaves the magnetic field to be demagnetized. On the other hand, when the first magnetic regenerator 11 leaves the magnetic field to be demagnetized, the second magnetic regenerator 12 enters the magnetic field to be magnetized. To allow the first magnetic regenerator 11 and the second magnetic regenerator 12 to enter and leave the magnetic field, the first magnetic regenerator 11 and the second magnetic regenerator 12 may be configured to rotate.

The fluid supply device 14 changes flow of the heat transfer fluid between two directions (indicated by the solid line arrows and dotted line arrows) to supply the heat transfer fluid into the first magnetic regenerator 11 and the second magnetic regenerator 12.

In addition, the fluid supply device 14 switches the flow in the guide flow passage 15 between the direction indicated by the solid line arrow and the direction indicated by the dotted line arrows at the time of magnetization and demagnetization of each of the first magnetic regenerator 11 and the second magnetic regenerator 12.

That is, when the first magnetic regenerator 11 is magnetized and the second magnetic regenerator 12 is demagnetized, a high-temperature flow passage allowing the fluid to flow therethrough is formed through the magnetized first magnetic regenerator 11 and a low-temperature flow passage allowing the fluid to flow therethrough is formed through the demagnetized second magnetic regenerator 12.

In contrast, when the first magnetic regenerator 11 is demagnetized and the second magnetic regenerator 12 is magnetized, a low-temperature flow passage allowing the fluid to flow therethrough is formed through the demagnetized first magnetic regenerator 11 and a high-temperature flow passage allowing the fluid to flow therethrough is formed through the magnetized second magnetic regenerator 12.

The first magnetic regenerator 11 and the second magnetic regenerator 12 are continuously and alternately magnetized and demagnetized by the magnetic poles of the magnets 13. The fluid supply device 14 begins to supply the heat transfer fluid into the first magnetic regenerator 11 and the second magnetic regenerator 12 at the time of magnetization and demagnetization. As the cycle of magnetization and demagnetization repeats, a temperature difference occurs between the cold side and the hot side. Thereby, the heat exchangers positioned at both ends of each of the cold side and the hot side perform heat exchange, implementing the cooling function of the magnetic cooling apparatus.

Accordingly, the effects of heat dissipation and heat absorption which occur when the first magnetic regenerator 11 and the second magnetic regenerator 12 are magnetized and demagnetized may be used for heating and cooling. In this way, the cooling module 10 may create low temperature and high temperature environments using the heating and cooling operation of the first magnetic regenerator 11 and the second magnetic regenerator 12.

As to types of the heat transfer fluid, water, alcohols, antifreezes such as ethylene glycol, helium gas, and mixtures thereof may be used.

The guide flow passage 15 connects the first magnetic regenerator 11, the second magnetic regenerator 12 and the fluid supply device 14 such that the heat transfer fluid reciprocates through the first magnetic regenerator 11, the second magnetic regenerator 12 and the fluid supply device 14.

The cooling module 10 forms a pair of closed loops. By circumferentially disposing plural cooling modules 10 configured as shown in FIG. 1, a rotary magnetic cooling apparatus is implemented, which will be described with reference to FIGS. 2 and 3.

Figure 2:
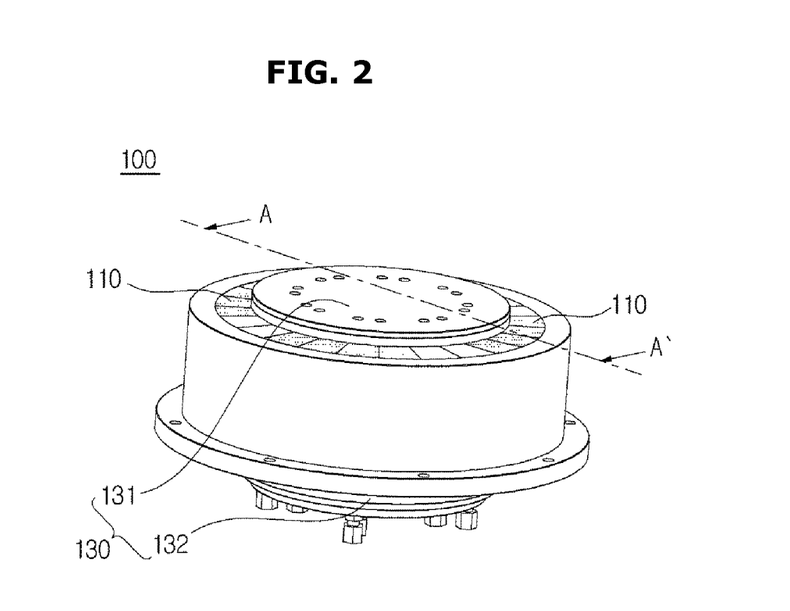
FIG. 2 is a perspective view showing the entire rotary magnetic cooling apparatus according to the illustrated embodiment.
Figure 3:
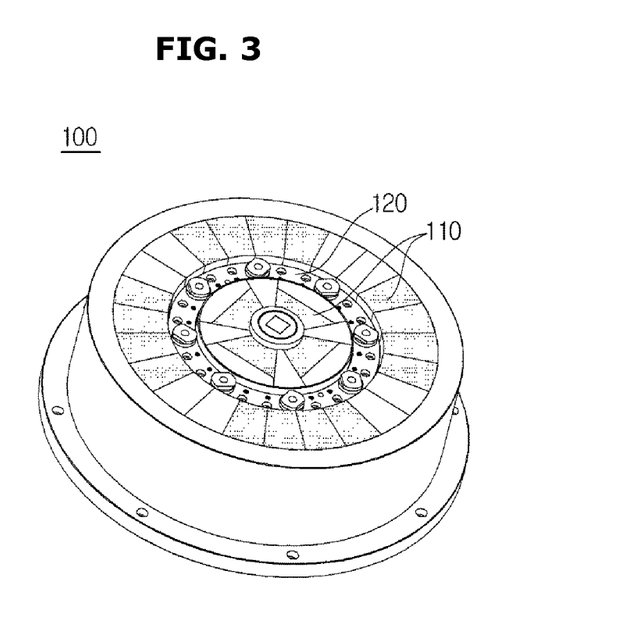
FIG. 3 is a perspective view showing the upper portion of the rotary magnetic cooling apparatus according to the illustrated embodiment, with the heat exchanger removed therefrom.

FIG. 2 is a perspective view showing the entire rotary magnetic cooling apparatus according to the illustrated embodiment, and FIG. 3 is a perspective view showing the upper portion of the rotary magnetic cooling apparatus according to the illustrated embodiment, with the heat exchanger removed therefrom.

In this embodiment, the magnetic cooling apparatus 100 includes a four-pole magnet configured with four magnetic field areas and four non-magnetic field areas, and eight magnetic regenerators 11 and 12. Thereby, the magnetic cooling apparatus 100 forms four pairs of closed loops.

In FIGS. 2 and 3, the magnetic cooling apparatus 100 includes a magnet unit 110 divided into an inner part and an outer part according to the rotational property of the magnetic cooling apparatus and disposed in the form of a circle, and a magnetic regenerator unit 120 disposed in the magnetic field created by the magnet unit 110 divided into an inner part and an outer part.

The magnet unit 110 employs four-pole magnets 112 and 114 configured with four magnetic field areas and four non-magnetic field areas.

The magnetic regenerator unit 120 includes four cooling modules 10 forming four pairs of closed loops, in which eight magnetic regenerators 11 and 12 are disposed in a circumferential direction.

Each cooling module 10 forming one pair of closed loops is provided with two magnetic regenerators 11 and 12 configured as a pair (see FIG. 1). Accordingly, the magnetic cooling apparatus 100 may be configured by disposing four cooling modules 10 in the circumferential direction.

A heat exchanger 130 is installed at both ends of the magnetic regenerator unit 120. In the heat exchanger 130, the heat transfer fluid having passed through the magnetic regenerators 11 and 12 absorbs heat from the external air or releases heat to the external air.

The heat exchanger 130 includes a hot-side heat exchanger 131 that the magnetic field having become relatively hot by receiving heat from the magnetic regenerators 11 and 12 put in the magnetic field enters or leaves, and a cold-side heat exchanger 132 that the heat transfer fluid having become relatively cold by transferring heat to the magnetic regenerators 11 and 12 released from the magnetic field by withdrawal of the magnet unit 110 enters and leaves.

The heat transfer fluid performs heat exchange by circulating alternately counterclockwise and clockwise according to application and withdrawal of the magnetic field to the magnetic regenerators 11 and 12 by the magnets 112 and 114. Therefore, for the valid heat exchange to occur in the hot-side heat exchanger 131 or the cold-side heat exchanger 132, the heat transfer fluid having passed through the magnetic regenerators 11 and 12 needs to reach the hot-side heat exchanger 131 or the cold-side heat exchanger 132 within half the time of one heat exchange cycle. To this end, the hot-side heat exchanger 131 or the cold-side heat exchanger 132 needs to be disposed within a certain distance from the magnetic regenerators 11 and 12, namely at the shortest distance.

Figure 4:
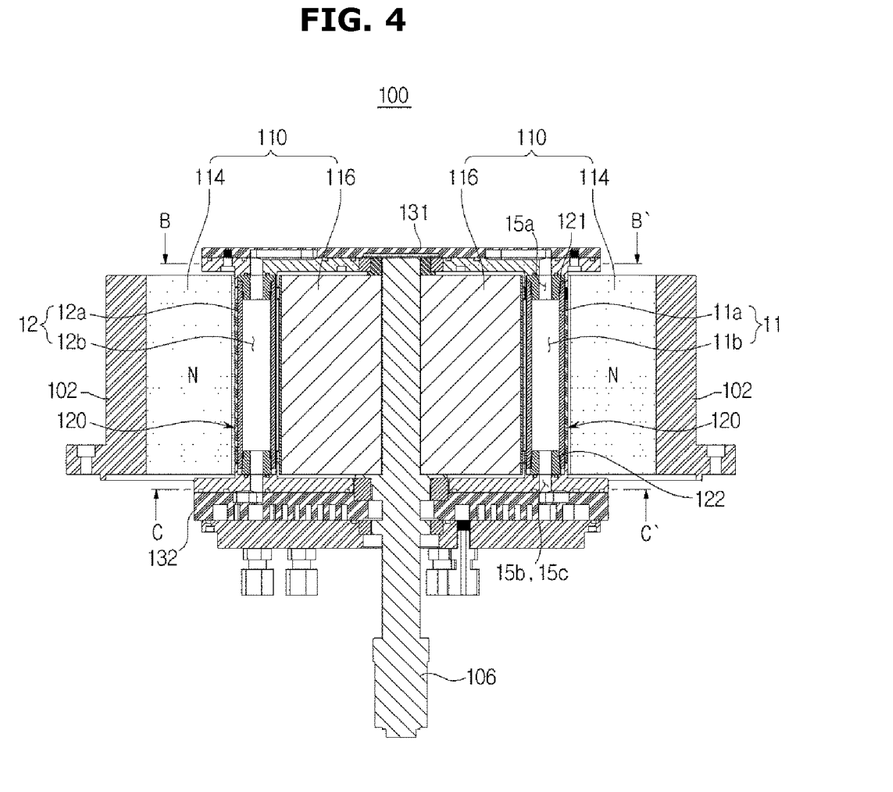
FIG. 4 is a cross-sectional view taken along line A-A' of FIG. 2.
Figure 5:
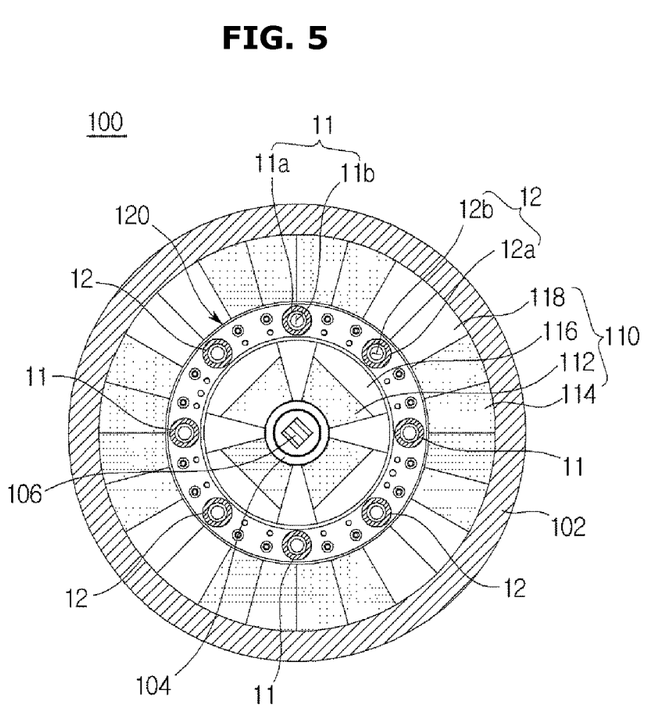
FIG. 5 is a plan view taken along line B-B' of FIG. 4.

FIG. 4 is a cross-sectional view taken along line A-A' of FIG. 2, and FIG. 5 is a plan view taken along line B-B' of FIG. 4.

Referring to FIGS. 4 and 5, the magnetic cooling apparatus 100 includes a magnetic regenerator unit 120 provided with plural magnetic regenerators 11 and 12, a magnet unit 110 to apply magnetic field to the magnetic regenerators 11 and 12 and withdraw the applied magnetic field, a hot-side heat exchanger 131, in which the heat transfer fluid having received heat from the magnetic regenerators 11 and 12 subjected to the magnetic field applied by the magnet unit 110 dissipates heat, a cold-side heat exchanger 132, in which the heat transfer fluid having transferred heat to the magnetic regenerators 11 and 12 released from the magnetic field by the magnet unit 110 absorbs heat, and guide flow passages 15a, 15b and 15c to connect the magnetic regenerators 11 and 12, the hot-side heat exchanger 131, and the cold-side heat exchanger 132 such that the heat transfer fluid reciprocates through the magnetic regenerators 11 and 12, the hot-side heat exchanger 131, and the cold-side heat exchanger 132.

The magnetic regenerator unit 120 includes a cylindrical housing 104, plural magnetic regenerators 11 and 12 radially arranged in the housing 104 and spaced apart from each other along the circumferential direction of the housing 104, and a rotating shaft 106 coupled to the center of the housing 104 to rotate the housing 104.

The magnetic regenerators 11 and 12 allow the heat transfer fluid to pass therethrough and contain a magnetocaloric material. The magnetic regenerators 11 and 12 include cylindrical bodies 11a and 12a, and through holes 11b and 12b formed in the longitudinal direction of the bodies 11a and 12a. The bodies 11a and 12a may be formed of a material such as plastics with low thermal conductivity. The through holes 11b and 12b are filled with a magnetocaloric material.

The magnetocaloric material has a property that the temperature thereof changes according to application and withdrawal of the magnetic field, i.e., the magnetocaloric effect. Materials that has a strong magnetocaloric effect include gadolinium (Gd), manganese iron compounds (MnFe) and lanthanum iron compounds (LaFe), which are fine powders. These magnetocaloric materials have pores having high permeability for flow of the heat transfer fluid, and have high capacity to absorb and dissipate heat.

The magnetocaloric effect is increase or decrease in temperature of the magnetocaloric material upon application or withdrawal of the magnetic field. Such magnetocaloric effect results from conservation of entropy. When the magnetic field is applied to the magnetocaloric material, arrays of particles of the magnetocaloric material are ordered and temperature of the magnetocaloric material increases. When the magnetic field is withdrawn from the magnetocaloric material, the arrays go back to the disordered state and the temperature of the magnetocaloric material decreases. The first magnetic regenerator 11 and the second magnetic regenerator 12 produce a cooling effect through such variation in temperature.

Provided at both ends of the through holes 11b and 12b are connectors 121 and 122 respectively connected to the guide flow passages 15a, 15b and 15c. The connectors 121 and 122 allows the magnetic regenerators 11 and 12 to be connected to the hot-side heat exchanger 131 and the cold-side heat exchanger 132 through the guide flow passages 15a, 15b and 15c such that the heat transfer fluid flows into the hot-side heat exchanger 131 and the cold-side heat exchanger 132 after passing through the magnetic regenerators 11 and 12. While the heat transfer fluid flows through the through holes 11b and 12b, the heat transfer fluid absorbs heat produced by the magnetocaloric material or loses heat to the magnetocaloric material by contacting the magnetocaloric material. When the magnetic regenerators 11 and 12 are subjected to the magnetic field, the heat transfer fluid absorbs heat produced by the magnetocaloric material and flows into the hot-side heat exchanger 131, where the heat transfer fluid dissipates the heat. When the magnetic regenerators 11 and 12 are released from the magnetic field, the heat transfer fluid loses heat to the magnetocaloric material and flows into the cold-side heat exchanger 132, where the heat transfer fluid absorbs heat.

The magnet unit 110 includes plural magnets 112 and 114 having at least one pair of N and S poles. The magnets 112 and 114 are radially disposed at the inner and outer sides of the housing 104 to apply the magnetic field to the magnetic regenerators 11 and 12 or withdraw the applied magnetic field. The N poles and S poles are disposed at the inner and outer sides of the magnetic regenerator unit 120 in the circumferential direction of the magnetic regenerator unit 120. The magnets 112 and 114 are supported by a first magnet support 116 and a second magnet support 118 respectively arranged at the inner side and outer side of the magnetic regenerator unit 120.

The hot-side heat exchanger 131 and the cold-side heat exchanger 132 are disposed on circulation paths of the heat transfer fluid extending in opposite directions, with the magnetic regenerator unit 120 placed between the hot-side heat exchanger 131 and the cold-side heat exchanger 132. Heating may be performed through the heat dissipation effect of the hot-side heat exchanger 131, or cooling may be performed through the heat absorption effect of the cold-side heat exchanger 132.

Reference numeral 102 denotes the body housing of the magnetic cooling apparatus 100.

Figure 6:
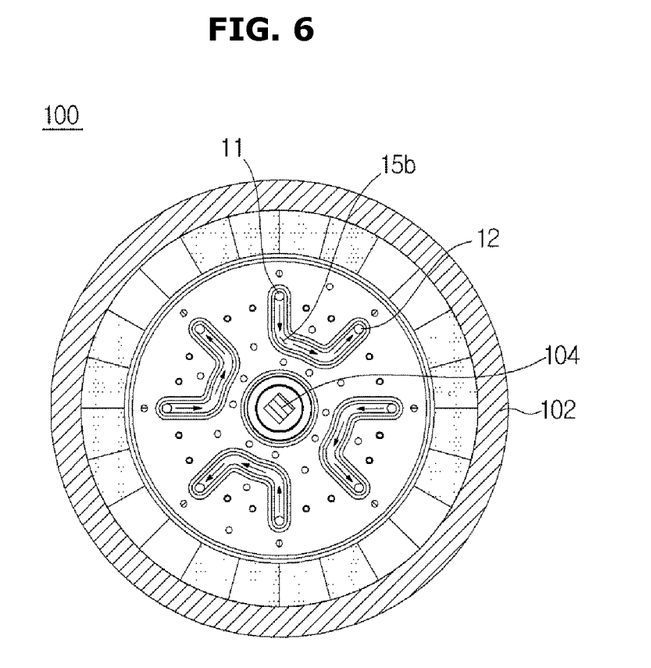
FIG. 6 is a cross-sectional view showing the structure of the upper flow passage of the magnetic regenerator unit, taken along line B-B' of FIG. 4.
Figure 7:
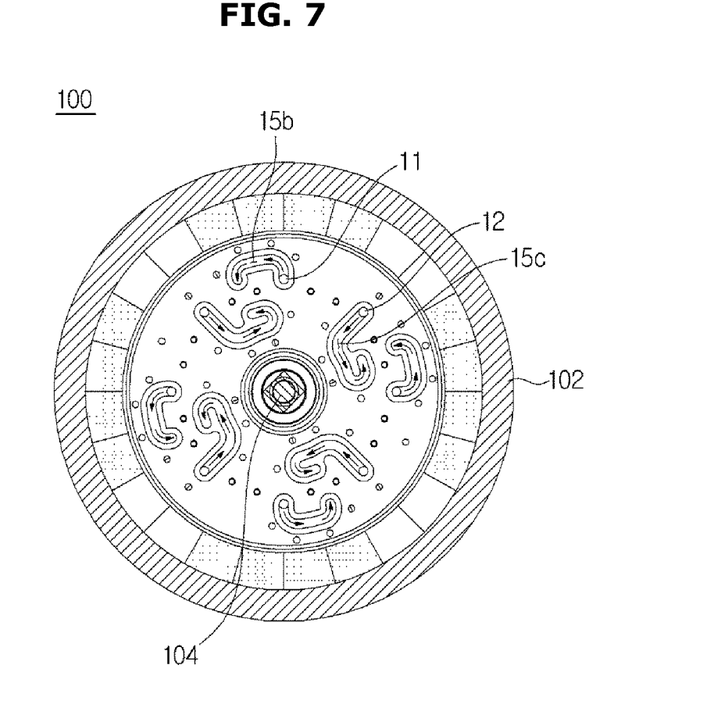
FIG. 7 is a cross-sectional view showing the structure of the lower flow passage of the magnetic regenerator unit, taken along line C-C' of FIG. 4.

FIG. 6 is a cross-sectional view showing the structure of the upper flow passage of the magnetic regenerator unit 120, taken along line B-B' of FIG. 4, FIG. 7 is a cross-sectional view showing the structure of the lower flow passage of the magnetic regenerator unit 120, taken along line C-C' of FIG. 4.

Referring to FIGS. 6 and 7, the guide flow passages 15a, 15b and 15c are joined to one side of the magnetic regenerator unit 120 in the axial direction of the magnetic regenerator unit 120 to allow the heat transfer fluid to flow between one magnetic regenerator 11 (hereinafter, a 'first magnetic regenerator') of the magnetic regenerators 11 and 12 that is subjected to the magnetic field applied by the magnets 112 and 114 and the other magnetic regenerator 12 (hereinafter, a 'second magnetic regenerator') released from the magnetic field applied by the magnets 112 and 114.

Hereinafter, a description will be given of the process in which the heat transfer fluid dissipates heat to the surroundings or absorbs heat from the surroundings while circulating through the magnetic regenerator unit 120, the hot-side heat exchanger 131 and the cold-side heat exchanger 132.

For the magnetic cooling apparatus 100 to use the magnetocaloric effect of a magnetocaloric material, magnetization and demagnetization of the magnetocaloric material need to repeatedly occur. Accordingly, a description will be given of a drive system to rotate the first magnetic regenerator 11 and the second magnetic regenerator 12 filled with the magnetocaloric material and allowing flow of the heat transfer fluid therethrough, with reference to FIG. 8.

Figure 8:
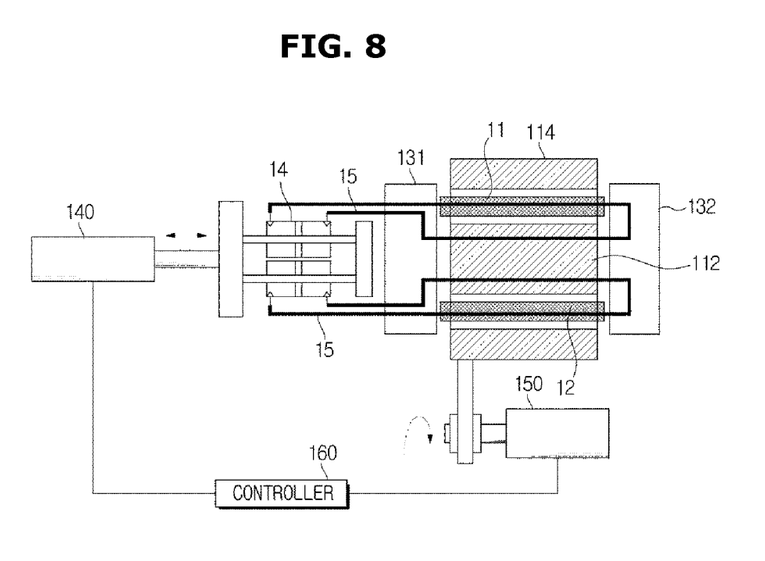
FIG. 8 is a block diagram illustrating a drive system of a rotary magnetic cooling apparatus according to one embodiment of the present disclosure.

FIG. 8 is a block diagram illustrating a drive system of a rotary magnetic cooling apparatus according to one embodiment of the present disclosure.

Referring to FIG. 8, the drive system of the magnetic cooling apparatus 100 includes a first drive unit 140 disposed in the guide flow passage 15 of the heat transfer fluid to drive the fluid supply device 14 to circulate the heat transfer fluid, the first magnetic regenerator 11 and a second drive unit 150 to rotate the magnetic regenerator unit 120 provided with the second magnetic regenerator 12, and a controller 160 to control operation of the first drive unit 140 and the second drive unit 150.

The fluid supply device 14 switches flow of the heat transfer fluid between two directions to supply the heat transfer fluid into the first magnetic regenerator 11 and the second magnetic regenerator 12.

According to this embodiment, the magnetic cooling apparatus 100 includes four cooling modules 10, in which the magnetic regenerator unit 120 including eight magnetic regenerators 11 and 12 is circumferentially disposed.

Accordingly, each of the cooling modules 10 needs four fluid supply devices 14 to supply the heat transfer fluid. The four fluid supply devices 14 are connected to each other to form one unit such that the heat transfer fluid flows in the same direction.

The first drive unit 140 is a linear motor to drive the four fluid supply devices 14. The first drive unit 140 is controlled by the controller 160.

The second drive unit 150 is a motor to rotate the magnetic regenerator unit 120 provided with the eight magnetic regenerators 11 and 12. The second drive unit 150 is controlled by the controller 160.

In addition, the second drive unit 150 further includes a power transmission system to convert the driving force of the motor into rotational motion of the magnetic regenerators 11 and 12.

As the rotating shaft 106 connected to the second drive unit 150 rotates, the magnetic regenerator unit 120 disposed in the housing 104 and the housing 104 coupled to the rotating shaft 106 rotate about the rotating shaft 106. The first magnetic regenerator 11 and the second magnetic regenerator 12 of the magnetic regenerator unit 120 rotating about the rotating shaft 106 sequentially enter and leave the magnetic field formed at the inner side and outer side of the housing 106 by the magnets 112 and 114. When the first magnetic regenerator 11 and the second magnetic regenerator 12 enter the magnetic field, the heat transfer fluid passing through the first magnetic regenerator 11 and the second magnetic regenerator 12 receives heat from the first magnetic regenerator 11 and the second magnetic regenerator 12. When the first magnetic regenerator 11 and the second magnetic regenerator 12 leave the magnetic field, the heat transfer fluid passing through the first magnetic regenerator 11 and the second magnetic regenerator 12 transfers heat to the first magnetic regenerator 11 and the second magnetic regenerator 12.

Accordingly, after dissipating heat to the surroundings, the heat transfer fluid flows through the guide flow passage 15 into the first magnetic regenerator 11 and the second magnetic regenerator 12 subjected to the magnetic field applied by the magnets 112 and 114.

The heat transfer fluid introduced into the first magnetic regenerator 11 and the second magnetic regenerator 12 absorbs heat from the first magnetic regenerator 11 and the second magnetic regenerator 12. Then, the heat transfer fluid in a heated state dissipates the heat absorbed from the first magnetic regenerator 11 and the second magnetic regenerator 12 to the surroundings when transported through the guide flow passage 15.

Through this process, the heat transfer fluid completes one heat exchange cycle. By successive repetition of the heat exchange cycle through magnetization and demagnetization of the first magnetic regenerator 11 and the second magnetic regenerator 12 during rotation about the rotating shaft 106, a difference in temperature between the cold side and the hot side is produced, and heat exchange is caused in the heat exchangers 131 and 132 positioned at both ends of the first magnetic regenerator 11 and the second magnetic regenerator 12 to obtain the hot state or cold state necessary for heating or cooling.

In the illustrated embodiment, the magnets 112 and 114 are fixed to maintain a constant magnetization region, and the magnetic regenerator unit 120 is rotated. However, the structure of the magnetic cooling apparatus 100 is not limited thereto. That is, the magnetic regenerator unit 120 may be fixed, while the magnets 112 and 114 may rotate about the magnetic regenerator unit 120 to apply magnetic field to the first magnetic regenerator 11 and the second magnetic regenerator 12 or withdraw the applied magnetic field. In this case, the rotating shaft 106 may be coupled and fixed to the centers of the magnets 112 and 114, rather than to the housing 104.

Alternatively, an assembly of the magnetic regenerator unit 120 and the fluid supply device 14 may be rotated.

In the illustrated embodiment, separate motors are employed as the first drive unit 140 to drive the fluid supply device 14 and the second drive unit 150 to rotate the magnetic regenerator unit 120. However, embodiments of the magnetic cooling apparatus 100 are not limited thereto. That is, the magnetic cooling apparatus 100 may be designed such that one motor drives the fluid supply device 14 and rotates the first magnetic regenerator 11 and the second magnetic regenerator 12. In this case, a power transmission structure such as a link to convert rotational motion into rectilinear motion may be used, As is apparent from the above description, according to embodiments of a magnetic cooling apparatus and a method of controlling the same, a bidirectional fluid supply device is used to supply a heat transfer fluid into magnetic regenerators subjected to or released from magnetic field, and thus necessity of a rotary sealing part is eliminated. Accordingly, fluid leakage may be prevented, and the magnetic cooling apparatus may eliminate concern over deterioration of a rubber material. In addition, since the magnetic cooling apparatus is operable under the condition of higher frequency and higher pressure than when a rotary valve is used, higher cooling performance may be obtained. In addition, the simple structure of flow passages may enhance heat transfer efficiency and cooling performance, and the number of magnetic regenerators may be easily increased or reduced by providing the same in the form of a module.

Although a few embodiments of the present disclosure have been shown and described, it would be appreciated by those skilled in the art that changes may be made to the embodiments without departing from the principles and spirit of the invention, the scope of which is defined in the claims and their equivalents.

What is claimed is:

1. A magnetic cooling apparatus comprising:
    a cooling module, the cooling modules including
        two magnetic regenerators including a first magnetic regenerator and second magnetic regenerator, each of the two magnetic regenerators being configured to allow a heat transfer fluid to pass therethrough and being filled with a magnetocaloric material;
        a bi-directional fluid supply device to alternately supply from two directions the heat transfer fluid into the two magnetic regenerators; and
        a guide flow passage arranged to connect the two magnetic regenerators to the bi-directional fluid supply device to guide flow of the heat transfer fluid as a pair of closed loops;
    a plurality of magnets to alternately apply a magnetic field to the two magnetic regenerators and withdraw the applied magnetic field, the cooling module being disposed in the magnetic field created by the magnets;
    a first drive unit to drive the bi-directional fluid supply device;
    a second drive unit to rotate the two magnetic regenerators; and
    a controller to control operation of the first drive unit and the second drive unit,
    wherein the cooling module is rotatably arranged in a circumferential direction, and
    wherein the controller is configured to control the first drive unit to drive the bi-directional fluid supply device to switch the direction of the flow in the guide flow passage at the time of magnetization and demagnetization of each of the first magnetic regenerator and the second magnetic regenerator.

2. The magnetic cooling apparatus according to claim 1, wherein the plurality of magnets are disposed at an inner side and an outer side in a circular form, with the two magnetic regenerators placed between the plurality of magnets.

3. The magnetic cooling apparatus according to claim 2, wherein the cooling module is disposed between the inner-side magnets and outer-side magnets of the plurality of magnets in a circumferential direction.

4. The magnetic cooling apparatus according to claim 2, wherein the two magnetic regenerators are arranged in an array between the inner-side magnets and the outer-side magnets to construct a magnetic regenerator unit.

5. The magnetic cooling apparatus according to claim 1, wherein the plurality of magnets comprise four-pole magnets configured with four magnetic field regions and four non-magnetic field regions.

6. The magnetic cooling apparatus according to claim 1, heat exchangers are disposed on flow passages provided at opposite ends of the magnetic regenerator unit.

7. The magnetic cooling apparatus according to claim 1, wherein each of the first drive unit and second drive unit includes a separate motor.

8. The magnetic cooling apparatus according to claim 1, wherein the first drive unit and second drive unit are a single motor.

9. A method of controlling a magnetic cooling apparatus including a plurality of cooling modules, each of the cooling modules including at least two magnetic regenerators including a first magnetic regenerator and second magnetic regenerator, each of the two magnetic regenerators being configured to allow a heat transfer fluid to pass therethrough and being filled with a magnetocaloric material, a bi-directional fluid supply device to supply the heat transfer fluid into only the first magnetic regenerator from a first direction and alternately to supply the heat transfer fluid into only the second magnetic regenerator from a second direction, a plurality of magnets to apply a magnetic field to the two magnetic regenerators and withdraw the applied magnetic field, and a guide flow passage arranged to connect the two magnetic regenerators to the bi-directional fluid supply device to guide flow of the heat transfer fluid as a pair of closed loops, the method comprising:

rotating, by a controller, the two magnetic regenerators;

operating, by the controller, the bi-directional fluid supply device to change the direction of the heat transfer fluid into only one of the two magnetic regenerators at the time when magnetization and demagnetization of the two magnetic regenerators are switched from one to the other according to rotation of the two magnetic regenerators;

operating, by the controller, the bi-directional fluid supply device when magnetization and demagnetization of the two magnetic regenerators are switched from one to the other according to rotation of the magnets,     wherein, when the magnets rotate, the two magnetic regenerators are fixed so as not to rotate.

\* \* \* \* \*